April 3, 1951          B. MLADEK          2,547,165
TRANSMISSION GEAR FOR LARGE GEAR RATIOS
Filed July 30, 1947
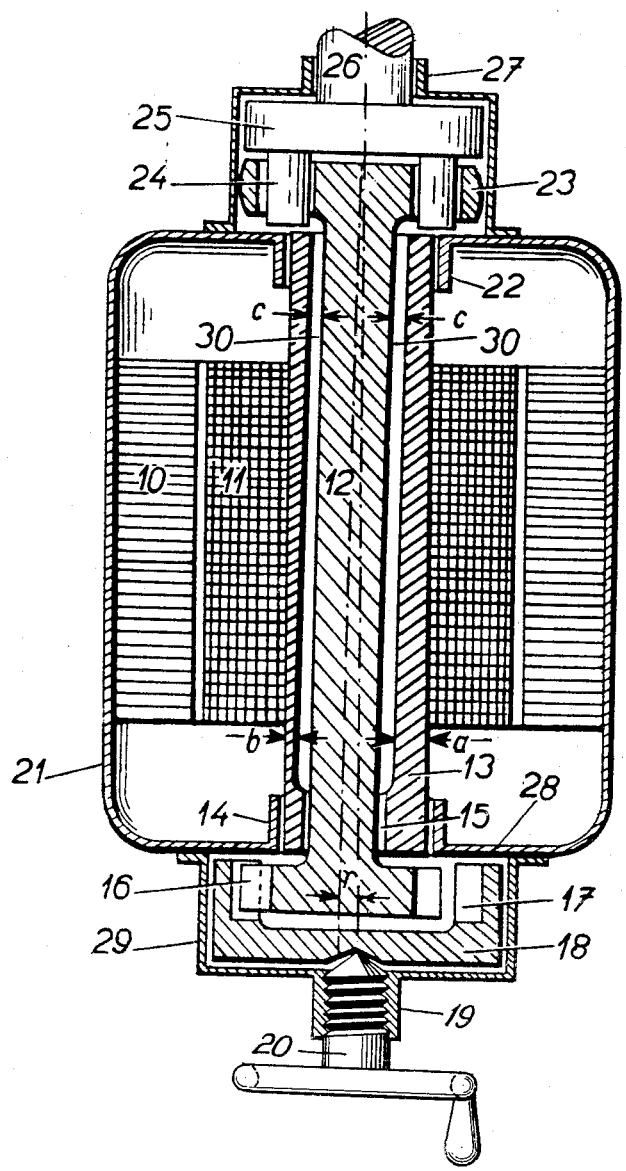
INVENTOR.
Bedrich Mladek
BY Patented Apr. 3, 1951

2,547,165

UNITED STATES PATENT OFFICE 2,547,165

TRANSMISSION GEAR FOR LARGE GEAR RATIOS

Bedřich Mládek, Liberec, Czechoslovakia

Application July 30, 1947, Serial No. 764,830
In Germany February 4, 1944

Section 1, Public Law 690, August 8, 1946
Patent expires February 4, 1964

7 Claims. (Cl. 74—785)

This invention relates to transmission gears and more particularly to gears for large gear ratios.

It is an object of this invention to provide a simplified gear of that type of transmission gears for large gear ratios wherein two shafts are used of which one is disposed within the other.

It is a further object of the invention to provide a transmission gear of the kind just referred to wherein not more than a single pair of gear wheels need be used and counterbalancing of the rotational system of the gear may be obtained in a very simple manner so as to assure simplicity and noiselessness of the entire gear also at high speeds.

It is a further object of the invention to provide a gear for large gear ratios of the type referred to which is suitable for such high ratios as e. g. 100:1, and in particular for use with fast running electromotors, such as single-phase capacitor motors connected directly with low speed working machines, e. g. kitchen machines.

The accompanying drawing shows a longitudinal section, partly in diagrammatic form, through one illustrative example of a gear embodying the invention.

In the drawing, 10 denotes the stator of an electromotor having a housing 21. The rotor 11 of said electromotor is connected to an outer hollow shaft 13 which has an oblique bore 30 so that the wall of the shaft 13 has a greater thickness $a$ at one side than on the other where this thickness is indicated as $b$. As shown in the drawing, this difference in thickness exists along the whole length of the shaft 13 and is larger next to the gear wheels 16 and 17 where a larger mass is located with a radius of eccentricity $r$. The hollow shaft 13 carrying the rotor 11 is supported in bearings 14, 22 of the housing 21.

Parallel to the bore 30 and therefore likewise in oblique position relative to the axis of the motor, the inner shaft 12 is rotatably mounted in the hollow shaft 13, there being provided a clearance $c$ between the two shafts up to the bearing 15 to permit the inner shaft 12 to assume a balanced position. The bearing 15, while in the drawing, for the sake of simplicity of illustration, is shown as a sleeve bearing, may be suitably in the form of a ball bearing.

The rear end of the inner shaft 12 is connected with the working shaft 26, such as by means of the flexible coupling 23, 24, 25 shown in the drawing. The front end of the shaft carries a toothed wheel 16 meshing with a toothed wheel 17. The oblique support of the wheel 16 arranged with a radius of eccentricity $r$ makes possible the use of a single pair of gear wheels 16, 17 even if there is only a slight difference in the number of the teeth of the two wheels. If, for instance, the wheel 16 had thirty teeth and the wheel 17 thirty-one teeth, then, as known in the art, the gear ratio is 30:1.

The outer wheel 17 is provided with means for arresting said wheel, these arresting or locking means being indicated in the drawing by way of example as consisting of a screw 20 within a stationary nut 19. The screw 20 presses the rim of the wheel 17 against the braking surface 28 of the motor housing 21. Instead of the illustrated screw 20 any other braking device may be used supported, for instance, by the housing wall 29 and operating upon the circumference of the wheel 17.

The rotational system of the gear, that is to say, the hollow shaft 13 with the rotor 11 and the inner shaft 12 with the gear wheel 16 can be balanced out by correctly selecting the dimensions of the enlarged cavity 30 of the shaft 13 behind the bearing 15, the stronger wall $a$ of the hollow shaft 13 then forming the counter weight to the eccentrically situated shaft 12 with the gear wheel 16.

Motors with small starting moment, such as single-phase capacitor motors, are started without load and loosened screw 20. Tightening of the screw 20 thereafter results in a braking action upon the toothed wheel 17 until this wheel comes to a complete standstill causing thereby rotation of the inner shaft 12 together with the working machine under load connected to the working shaft 26.

Motors having sufficient starting moment, such as a three-phase motor with shortcircuited rotor, may be started under load, that is to say, with tightened screw 20 and the toothed wheel 17 standing still. In such cases the arresting or locking mechanism 20 can be entirely omitted if the toothed wheel 17 is rigidly secured to the motor housing.

What I claim is:

1. A coaxial gear transmission for large gear ratios, comprising an electromotor having a rotor shaft and a stationary part, an outer driving shaft of cylindrical outer surface formed by the rotor shaft of said electromotor, an inner driven shaft extending through a lengthwise bore of said outer driving shaft, the axis of said inner driven shaft and the axis of said bore being of varying eccentricity with respect to the axis of the cylindrical outer surface of said outer driving shaft, said bore being provided at the end where its eccentricity is greatest with a bearing for said inner driven shaft, said bore and said bearing extending at an angle to the axis of the cylindrical outer surface of said outer driving shaft so that an end portion of said inner shaft projecting out of said bearing is adapted to perform a whirling conical movement upon rotation of said outer shaft, two gear wheels in engagement with each other, the one of said two gear wheels being rigidly connected with said whirling end of said inner shaft and the second of said two gear wheels being mounted independently of said outer and inner shafts, and means adapted to restrain said second gear wheel from rotation.

2. A gear transmission as claimed in claim 2, comprising arresting means for rigidly connecting said second gear wheel with said stationary part of the electromotor.

3. A coaxial gear transmission for large gear ratios, comprising an outer driving shaft of cylindrical outer surface formed by the rotor shaft of an electromotor, an inner driven shaft extending through a lengthwise bore of said outer driving shaft, the axis of said driven shaft and the axis of said bore being of varying eccentricity with respect to the axis of the cylindrical outer surface of said outer driving shaft, said bore being provided at the end where its eccentricity is greatest with a bearing for said inner driven shaft, said bore and said bearing extending at an angle to the axis of the cylindrical outer surface of said outer driving shaft so that an end portion of said inner shaft projecting out of said bearing is adapted to perform a whirling conical movement upon rotation of said outer shaft, two gear wheels in engagement with each other, the one of said two gear wheels being rigidly connected with said whirling end of said inner shaft and the second of said two gear wheels being mounted independently of said outer and inner shafts, a working shaft, means adapted to restrain said second gear wheel from rotation, and a flexible coupling including a part mounted on the end of said inner shaft which is opposite to said end carrying the gear wheel and another part mounted on said working shaft.

4. A gear transmission as claimed in claim 1, wherein the lengthwise bore of the outer shaft is cylindrical and its axis extends eccentrically and at an oblique angle to the axis of the outer cylindrical surface of said outer shaft, so that the thickness of the wall of said outer shaft is greater on one side than on the other in the radial direction and greater at the end of said outer shaft adjacent to said gear wheels than at the other end of said outer shaft.

5. A gear transmission for large gear ratios, comprising an electromotor having a rotor shaft and a stationary part, an outer driving shaft of cylindrical outer surface formed by the said rotor shaft of said electromotor and an inner driven shaft, said outer driving shaft having a lengthwise bore through which said inner shaft extends, a gear wheel carried by said inner shaft, a second gear wheel in engagement with said first named gear wheel and mounted independently of said inner shaft and said outer shaft but co-axially with the latter, the axis of said inner shaft and the gear wheel carried thereby extending eccentrically and at an oblique angle to the common axis of said outer shaft and said second gear wheel, said lengthwise bore in said outer shaft being cylindrical and its axis extending eccentrically and at an oblique angle to the axis of the outer cylindrical surface of said outer shaft, so that the thickness of the wall of said outer shaft is greater on one side than on the other in the radial direction and greater at the end of said outer shaft adjacent to said pair of gear wheels than at the other end of said outer shaft, a bearing within said outer shaft extending over a part of the length of said bore, for that end of said inner shaft which carries the one gear wheel and said bore, except for said bearing, surrounding said inner shaft with an appreciable clearance.

6. A gear transmission as claimed in claim 5 and comprising arresting means for rigidly connecting said second gear wheel with said stationary part of said electromotor to transmit the total torque of the outer driving shaft to said inner shaft.

7. A gear transmission as claimed in claim 1, wherein the axis of the inner shaft and the axis of the bore of the outer shaft are of equal eccentricity with respect to the axis of the cylindrical outer surface of said outer shaft, said eccentricity varying gradually along the length of said shaft so that the wall of said outer shaft varies gradually in thickness along its length, said two axes of said two shafts intersecting outside of the length of said outer shaft so that the wall of said outer shaft is thicker on one side than on the other along its entire length.

BEDŘICH MLÁDEK.

REFERENCES CITED

The following references are of record in the file of this patent:

UNITED STATES PATENTS

| Number | Name | Date |
|---|---|---|
| 422,356 | Smith | Feb. 25, 1890 |
| 541,382 | Nachtigal | June 18, 1895 |
| 1,158,458 | Dey | Nov. 2, 1915 |
| 1,316,936 | Blackman | Sept. 23, 1919 |
| 1,799,348 | Apple | Apr. 7, 1931 |